June 22, 1943.  A. T. McDONALD  2,322,463
LUBRICATING SYSTEM
Filed May 7, 1940  2 Sheets-Sheet 1
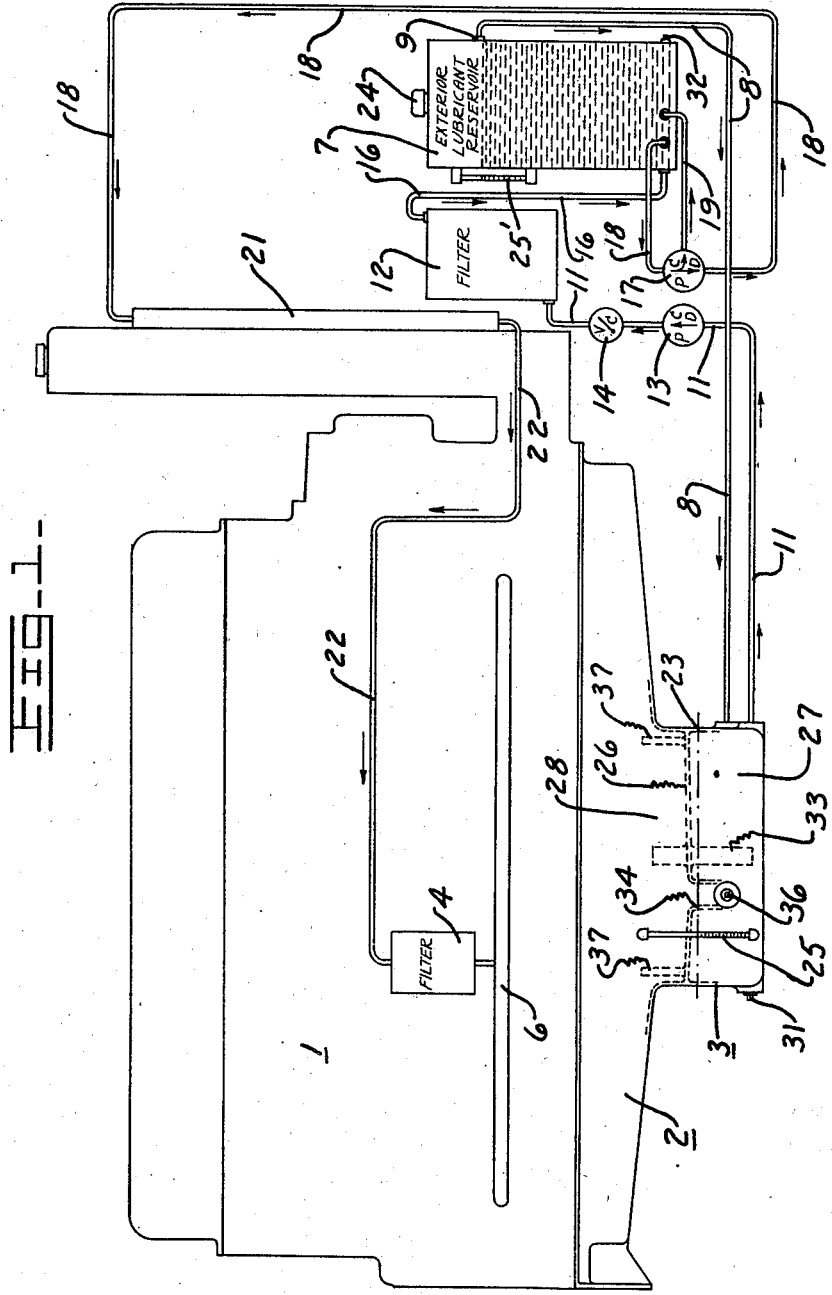
INVENTOR.
Allen T. Mc.Donald
BY Charles M. Fryer
ATTORNEY.

June 22, 1943.  A. T. McDONALD  2,322,463
LUBRICATING SYSTEM
Filed May 7, 1940  2 Sheets-Sheet 2
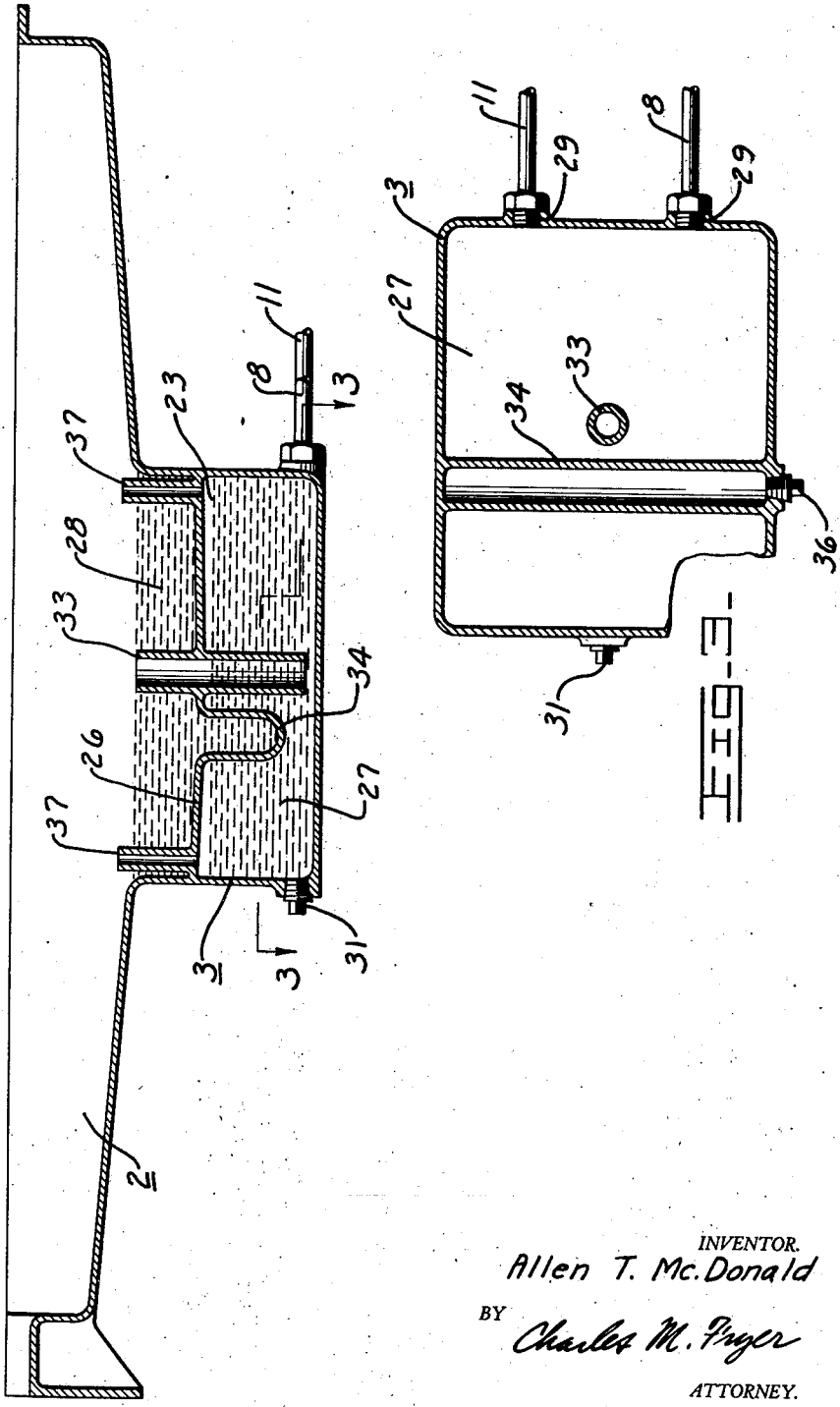
INVENTOR.
Allen T. Mc.Donald
BY Charles M. Pryer
ATTORNEY.

Patented June 22, 1943

2,322,463

UNITED STATES PATENT OFFICE 2,322,463

LUBRICATING SYSTEM

Allen T. McDonald, Peoria, Ill., assignor to Caterpillar Tractor Co., San Leandro, Calif., a corporation of California Application May 7, 1940, Serial No. 333,733

3 Claims. (Cl. 184—6)

My invention relates to engine lubrication, and more particularly to an exterior lubricating system for stationary internal combustion engine power plants.

With respect to internal combustion engines which are employed as stationary power plants, for example compression ignition or Diesel engines that provide the propelling power for locomotives, it is desirable that the lubricating system therefor be of such character as to enable the lubricant to stand up a long time and thus provide for long intervals between lubricant changes. This is so because it is not only costly but inconvenient and time consuming to have to change the lubricant at short intervals. In an effort to accomplish such desirable result, lubricating systems have been employed wherein an exterior or outside source of lubricant is maintained in a relatively large capacity tank or reservoir which is connected to the engine crankcase in such manner as to provide continuous circulation of lubricant between the crankcase and the exterior reservoir.

Such systems are of the so-called "dry sump" type, wherein no provision is made for the maintenance of a relatively high level of lubricant in the engine crankcase. As a result, the pump employed for transferring lubricant from the engine crankcase to the exterior reservoir, sucks air into the system, thus aerating the lubricant and destroying its lubricating properties with consequent reduction in the life of the lubricant. Furthermore, because the engine crankcase is substantially dry, it has a relatively high temperature causing vaporization and oxidation of some of the lubricant which drops into it from parts of the engine; and this also results in undue loss of lubricant and destruction of its lubricating properties. Hence, such "dry sump" type of system reduces the time between lubricant changes solely by virtue of the increased volume of lubricant resulting from the outside lubricant reservoir. However, because of the "dry sump", impairment of the lubricating properties of the lubricant results from the factors previously discussed, and renders it necessary to change the lubricant more frequently than would be necessary if such undesirable factors were eliminated.

My invention is designed to overcome the previously described disadvantages occurring in an exterior lubricating system of the "dry sump" type. It has as its objects, among others, the provision of an exterior lubricating system provided with an outside reservoir or source of lubricant which is so connected with the crankcase of the engine as to maintain a supply of lubricant therein, to thus provide a "wet sump" which precludes aeration of the lubricant circulated between the crankcase and the outside lubricant reservoir, and which consequently avoids vaporization of lubricant dropping from parts of the engine into the crankcase; and the provision of an engine crankcase which is of such construction as to segregate sludge from the lubricant to prevent interaction of the sludge constituents with the main body of lubricant and thus materially reduce undesirable oxidation of the lubricant, which is accelerated by interaction of the sludge with the main body of the lubricating oil. Other objects of my invention will become apparent from a perusal of the following description.

In general, the system of my invention comprises an exterior lubricant source which is connected to the crankcase of an engine by means which maintains a supply of lubricant therein. All piping connections with the crankcase are below the level of lubricant therein; and as a result, no aeration of the lubricant can occur. The crankcase is preferably of special construction wherein means is provided to collect and segregate sludge which is formed, to thus avoid contamination of the lubricant. In addition to the usual engine filter for the lubricant, I provide a relatively large capacity outside filter, and also means for cooling the lubricant, to thus further increase the life thereof.

Reference is now made to the drawings for a more detailed description of the invention, in which:

Fig. 1 is a schematic elevational view of the lubricating system of my invention.

Fig. 2 is a vertical sectional view of the special engine crankcase construction of my invention.

Fig. 3 is a horizontal section taken in planes indicated by line 3—3 in Fig. 2.

With reference to Fig. 1, the system of my invention is employed with internal combustion engine 1, preferably of the compression ignition or Diesel type, having crankcase 2 which is provided with the usual depending sump portion 3; the latter being of special construction, as will be described more fully hereinafter. Engine 1 is also provided with the usual lubricant filter 4 mounted thereon and which is connected to lubricant manifold 6 from which lubricant is conducted through suitable lubricating lines connected thereto to the various parts of the engine which require lubrication.

An exterior or outside lubricant reservoir or tank 7 of relatively large capacity, compared to the capacity of the crankcase, is connected by piping or conduit 8 to crankcase sump portion 3. It is to be observed that this piping 8 is connected to reservoir 7 at a point 9 well above the bottom thereof and also above the sump portion 3 to provide a large supply of lubricant in the reservoir 7, which can overflow at point 9 by gravity into the bottom of crankcase 2. From crankcase 2, lubricant is transferred through piping or conduit 11 to an outside filter 12 of any suitable construction, by means of any suitable constant delivery pump 13; a suitable check valve 14 being connected in piping 11 between filter 12 and pump 13 to prevent back flow of lubricant from the filter. Lubricant pumped from crankcase 2 through filter 12 is conducted by piping or conduit 16 back into reservoir 7; and from reservoir 7, lubricant is transferred to the engine by means of constant delivery pump 17 in piping or conduit 18. Pump 17 is preferably of larger capacity than required, and its discharge end is also connected to by-pass line 19, which conducts excess lubricant back to reservoir 7, to insure an adequate supply of lubricant for the engine at all times. Piping 18 may be connected directly to engine filter 4, but to increase the life of the lubricant, I preferably provide cooling means therefor to thereby reduce thermal decomposition; and for this purpose, piping 18 is connected to a suitable radiator lubricant cooler 21 which in turn is connected to filter 4 by piping or conduit 22.

The quantity of lubricant initially introduced into the system is in excess of that which will fill all the piping, filter 12, and reservoir 7 up to overflow 9, which as previously explained is above crankcase 2. Hence, such excess lubricant, which is the volume which would otherwise be contained in reservoir 7 above overflow 9, flows through piping 8 and will fill the crankcase to a predetermined level indicated at 23. As is illustrated schematically in Fig. 1, and in Figs. 2 and 3, the conduit connections with crankcase 2 are below the lubricant level. Hence, no air can be drawn into the lubricant stream at any time; and aeration of the lubricant, which causes the undesirable results previously discussed, is entirely obviated. In this connection, the level 23 of lubricant in the crankcase will remain substantially constant, except for lowering thereof, which results from normal consumption of lubricant by the engine. As lubricant is consumed by the engine, the supply may be readily replenished from time to time either by pouring fresh lubricant into the crankcase through its filling spout (not shown), or into reservoir 7 through a spout 24. A transparent gauge 25 is preferably provided to indicate lubricant level in the crankcase, and a similar gauge 25' is also preferably provided for reservoir 7.

As was previously related, crankcase 2 is of special construction to provide for collection and segregation of lubricant sludge. With particular reference to Figs. 2 and 3, sump portion 3 of the crankcase is segregated by horizontal wall 26 into a lower sump compartment 27 and an upper sump compartment 28. Lower sump 27 always contains clean lubricant, and is the one which is connected to lubricant reservoir 7 by piping 8 and 11. In one end wall thereof and adjacent the bottom, it is formed with threaded apertures 29 with which piping 8 and 11 are connected. For draining clean lubricant from lower sump 27 when desired, I provide the usual drain port which is normally sealed by a conventional drain plug 31; and a drain 32 is also provided for reservoir 7.

Extending through wall 26 is an overflow tube 33; and adjacent such tube 33, wall 26 is formed with settling trough 34 in which sludge settles from the lubricant which collects in the upper sump 28, as it flows from parts of the engine already lubricated. As the sludge settles to the bottom of sludge trough 34, the clean lubricant rising to the top overflows through overflow tube 33 into the lower clean lubricant sump 27. Sludge trough 34 is provided in one end near the bottom thereof with a sludge drain port which is normally sealed by a suitable drain plug 36. Vents 37 communicating with clean lubricant sump 27 extend above the level of lubricant in sludge sump 28, as determined by the top of overflow tube 33, to provide means for venting of air from lower sump 27. As is indicated in Fig. 2, the previously mentioned excess of lubricant which remains in the crankcase is such as to incompletely fill lower sump 27 so that the lubricant level 23 is below wall 26. As a result, the sludge free lubricant in sump 27 will not mix with the lubricant in upper sump 28.

Because of the large excess of lubricant which the exterior lubricant reservoir or tank 7 provides and inasmuch as the "wet sump" of my invention precludes aeration of the lubricant, which results in maintenance of its lubricating properties, relatively long intervals obtain before lubricant in the system need be completely changed. In this connection, the segregation of the sludge, which obtains by virtue of the described crankcase construction, also cooperates in maintaining the life of the lubricant; and this is also true with respect to the cooling means for the lubricant. Experiments which I have conducted have established that the "wet sump" system of my invention is so effective in maintaining the lubricating properties of the lubricant and reducing lubricant consumption, as to require complete lubricant changes at much longer intervals compared to the changes necessary in a "dry sump" system having the same exterior lubricant capacity.

I, therefore, claim as my invention:

1. A lubricating system for an engine having a crankcase comprising an exterior lubricant reservoir, piping between said crankcase and said reservoir having pumping means connected therein for continually transferring lubricant from said crankcase to said reservoir, piping having a connection with said reservoir and a connection with said crankcase through which lubricant in said reservoir overflows by gravity into said crankcase to provide continuous transfer of lubricant from said reservoir back to said crankcase and maintain a supply of lubricant in said crankcase at a level above the point of connection of said first mentioned piping to preclude aeration of said lubricant, and means including pumping means for transferring lubricant from said reservoir to engine mechanism to be lubricated.

2. A lubricating system for an engine having a crankcase comprising an exterior lubricant reservoir, piping between said crankcase and said reservoir having pumping means connected therein for continuously transferring lubricant from said crankcase to said reservoir, piping having a connection with said reservoir and a connection with said crankcase through which lubricant in said reservoir overflows by gravity into said crankcase to provide continuous transfer of lubricant from said reservoir back to said crankcase and maintain a supply of lubricant in said crankcase at a level above the point of connection of said first mentioned piping to preclude aeration of said lubricant, means including pumping means for transferring lubricant from said reservoir to engine mechanism to be lubricated, and exterior filtering means for said lubricant.

3. A lubricating system for an engine having a crankcase comprising an exterior lubricant reservoir, piping between said crankcase and said reservoir having pumping means connected therein for continuously transferring lubricant from said crankcase to said reservoir, piping having a connection with said reservoir and a connection with said crankcase through which lubricant in said reservoir overflows by gravity into said crankcase to provide continuous transfer of lubricant from said reservoir back to said crankcase and maintain a supply of lubricant in said crankcase at a level above the point of connection of said first mentioned piping to preclude aeration of said lubricant, means including pumping means for transferring lubricant from said reservoir to engine mechanism to be lubricated, exterior filtering means for said lubricant connected in said piping through which said lubricant is transferred from said crankcase to said reservoir, and means for cooling said lubricant.

ALLEN T. McDONALD.